United States Patent [19]

Selmeczi et al.

[11] 3,920,795

[45] Nov. 18, 1975

[54] STABILIZATION OF SLUDGE SLURRIES

[75] Inventors: Joseph G. Selmeczi; Donald H. Marlin, both of Pittsburgh; Daniel W. Kestner, Coraopolis, all of Pa.

[73] Assignee: Dravo Corporation, Pittsburgh, Pa.

[22] Filed: Mar. 8, 1973

[21] Appl. No.: 339,151

[52] U.S. Cl. ............... 423/242; 106/109; 106/117; 61/35
[51] Int. Cl.² ................... C01B 17/00; E02D 3/00
[58] Field of Search ............. 423/242–244; 61/35; 106/117, 109

[56] References Cited
UNITED STATES PATENTS

| | | | |
|---|---|---|---|
| 2,375,019 | 5/1945 | Miller | 61/35 |
| 3,230,103 | 1/1966 | Minnick | 106/117 |
| 3,500,934 | 3/1970 | Magnoson | 61/35 |
| 3,508,407 | 4/1970 | Booth | 61/35 |
| 3,565,648 | 2/1971 | Mori et al. | 106/117 X |
| 3,720,609 | 3/1973 | Smith et al. | 210/59 |
| 3,785,840 | 1/1974 | Minnick et al. | 106/118 |

*Primary Examiner*—Herbert T. Carter
*Assistant Examiner*—Gregory A. Heller
*Attorney, Agent, or Firm*—Parmelee, Miller, Welsh & Kratz

[57] ABSTRACT

The stabilization of aqueous sludge slurries containing calcium components is effected by the addition thereto of a granulated blast furnace slag. The aqueous sludge slurry should be dewatered such that the slurry contains about 25 to 60% solids and 75 to 40% aqueous portions, and the granulated blast furnace slag added thereto in an amount of about 1 to 20% based upon the amount of solids in the slurry.

11 Claims, No Drawings

STABILIZATION OF SLUDGE SLURRIES

BACKGROUND OF THE INVENTION

Aqueous sludge slurries are produced in various processes such as the removal of sulfur dioxide and fly ash from the gases in coal combustion and also as a result of various smelting operations. Generally, slurries result from the washing of the off-gases so as to remove the solid particles and sulfur components prior to discharging the gases into the atmosphere, such removal being required in order to reduce atmospheric pollution. The slurries are of such a composition that discarding of the slurries into natural waterways is prohibited and such that mere pooling or deposition of the slurries into reservoirs produces masses of nonstabilized soft solids masses, which render the site of deposition unusable.

The present invention effects stabilization or solidification of the solids in the sludge slurries and renders the slurries usable as a landfill material.

SUMMARY OF THE INVENTION

Aqueous sludge slurries containing calcium components and other inorganic components are stabilized by the addition of a basic glassy blast furnace slag to the slurry. The aqueous sludge slurry should be dewatered to the extent that the slurry contains 25–60% solids and 75–40% aqueous liquor and the basic glassy blast furnace slag added to the slurry in an amount of about 1–20% based upon the amount of solids in the slurry, so as to effect solidification of the sludge solids, which can be affected while covered with supernatant aqueous liquor.

DETAILED DESCRIPTION

The stabilization and solidification of aqueous calcium-containing inorganic sludge is effected by addition thereto of a basic granulated glassy blast furnace slag.

The sludges which are especially subject to treatment according to the present process are those sludges resulting from the sulfur-dioxide removal systems used in removing impurities from furnaces and stack gases of energy producing units. Coal burning boilers of power plants produce large amounts of fly ash, and/or sulfur dioxide during operation, which impurities must be removed from stack gases prior to discharging the gases to the atmosphere. Such conventional removal systems use limestone or lime in a wet scrubbing system which produces an aqueous slurry of fly ash, calcium sulfite, calcium sulfate and other components. These sludges are especially difficult to dispose of because of the nature of the solids in the sludges which are finally divided particles difficult to stabilize.

The present process enables stabilization of such sludges. The sludge should contain about 25–60% solid material in conjunction with about 75–40% aqueous liquor. Sludges containing less than about 25% solids should be subjected to a dewatering or clarification step such as by settling so as to increase the sludge solids content. The sludges contain calcium compounds such as sulfites and/or sulfates and other inorganics, and, in the case of sludges from coal-burning boilers, significant amounts of fly ash will also be present in the sludge. The process is effective, however, even when the sludge contains no fly ash, such as with sludges which result from oil-fired boilers or sludge from smelter gases.

To the aqueous sludge slurry there is added a basic granulated blast furnace slag. These slags are produced in iron making processes and formed as a granulated slag by quenching molten slag from a blast furnace in water. Such water quenching forms a glassy slag which is finely divided, and displays cementitious properties. While the composition of any particular such slag may vary from others, such slags would all contain various amounts of calcium, silica and alumina ingredients. Generally, such slags have an analysis in the following percentages;

| | | |
|---|---|---|
| $SiO_2$ | — | 30–40% |
| CaO | — | 40–50% |
| $Al_2O_3$ | — | 10–20% |
| MgO | — | 3–10% |
| S | — | 1–3% |
| MnO | — | 0.3–3% |
| $Fe_2O_3$ | — | 0.3% |
| P | — | trace | which analysis identifies the chemical composition but not the compounds therein. The analysis may vary to some extent depending upon the metallurgical process from which the slag results.

The granulated blast furnace slag, while in the form of fine particles, as compared to air-cooled slags, should be ground to a fineness such as will effect rapid stabilization of sludge solids. We have found that the slag should be ground to a particle size having a Blaine specific surface of from between about 1800–5000 sq. cm. per gram, with a Blaine value of about 3000 sq. cm. per gram being a preferred value.

The ground, glassy, granulated blast furnace slag is added to an aqueous sludge slurry containing 25–60% solids in an amount of between 1–20% based on the solids content of the sludge. Use of less than about 1% granulated blast furnace slag is insufficient to appreciably effect stabilization of the sludge, while the use of more than about 20% has no apparent advantage and would be inefficient and uneconomical.

The present invention, with the addition of the granulated blast furnace slag to an aqueous sludge slurry, provides a method for stabilizing the solids or hardening the solids content of the slurry, and while some chemical interaction must take place, the improved stability does not appear to be only the result of cementitious or hydraulic bonding between various ingredients, but also a result of certain physical changes which are effected within the solids slurry. In tests, the solids slurry, while offering some compressive or shear strength upon long settling without additives, exhibited surprising results when granulated blast furnace slag was added thereto, in that the shearing strength of sheared test samples of treated solids slurries, contrary to expectations, exhibited higher intergranular strength after soaking and reshearing of samples, evidencing some physical as well as chemical alteration of the slurry solids. It is postulated that perhaps formation of ettringite crystalline matter, a mineral of the composition $Ca_{12} Al_4 (OH)_{24} (SO_4)_6 \cdot 5H_2O$, occurs, or some other crystalline matter is formed, which in addition to forming a crystalline interlacing structure within the mass of solids, ties up water molecules therein to give stabilization to the mass.

The following examples further describe the present invention.

EXAMPLE 1

A sludge slurry from the fly ash and sulfur dioxide removal system of a coal burning boiler was tested for stability. The sludge had a water content of about 147% (ratio of weight of water to that of dried solid at 105°C. for 24 hours), or an equivalent average solid content of 40.5% by weight. An analysis of the sludge solids showed the composition to be:

Analysis of Sludge

| | | |
|---|---|---|
| $SiO_2$ | — | 28.3% |
| CaO | — | 21.0% |
| MgO | — | 0.5% |
| $SO_2$ | — | 16.0% |
| $SO_3$ | — | 3.5% |
| $CO_2$ | — | 3.0% |
| $R_2O_3$ | — | 20.5% |
| $Fe_2O_3$ | — | 3.6% | wherein $R_2O_3$ in the sludge comprises a mixture of $Mn_3O_4$, $TiO_2$, $Al_2O_3$, and $Fe_2O_3$; and the sludges had a fly ash content of about 55% of the dry solids content of the sludge.

Tests were run to determine the compressive strength of the sludge slurries. Samples of the slurries were placed in tubular containers and penetrometer readings taken at intervals during setting of the solids to measure the force required to penetrate a unit depth into the solids material in tons per square foot. To measure the strength, a Model CL-700 penetrometer made by Soiltest, Inc. of Chicago was used. Readings in the penetrometer could only be taken up to a value of 4.5 tons per square foot and values above this maximum are indicated as 4.5+. The values up to 4.5 tons per square foot, however, indicate the rate of increase in the compressive strength of the sludge. We have found that the penetrometer tests and the results of soil mechanical tests can be correlated.

An aliquot of the sludge was taken with no additives mixed thereto (Control). A second aliquot was taken to which there was added, 5% by weight of the dry sludge solids, a granulated blast furnace slag having the following composition: 32.2% $SiO_2$, 48.6% CaO, 8.9% MgO, 2.3% sulfur, 12.4% $Al_2O_3$, 1.8% $Fe_2O_3$, $Mn_3O_4$, and other trace materials. This aliquot was labeled "With Slag". The granulated blast furnace slag, prior to addition to the sludge, had been ground to a particle size of 3100 sq. cm/gr. (Blaine). Penetrometer readings were taken on the control and the sludge slurry following addition of the additive, over a period of time, the results of which were:

| Elapsed Time (days) | Penetrometer Reading (Tons/ft.²) | |
|---|---|---|
| | Control | With Slag |
| 3 | Too soft to measure | Too soft to measure |
| 9 | Too soft to measure | 2.15 |
| 18 | Too soft to measure | 2.75 |
| 35 | Too soft to measure | 4.00 |
| 42 | Too soft to measure | 3.75 |
| 49 | Too soft to measure | 4.4 |
| 76 | Too soft to measure | 4.5 |
| 90 | Too soft to measure | 4.5+ |

The stabilizing or hardening ability of the granulated blast furnace slag-stabilized slurry is evidenced whereas the Control, with no additive, was still too soft to measure on the penetrometer even after 90 days settling.

EXAMPLE 2

Comparative tests were run using 5% blast furnace slag to show the effect of the solids content of the sludge upon the stabilization thereof. The analysis of the sludge, on a dry sludge solid, was:

| | | |
|---|---|---|
| $SiO_2$ | — | 31.8% |
| CaO | — | 24.3% |
| MgO | — | 2.2% |
| $SO_2$ | — | 13.3% |
| $SO_3$ | — | 3.1% |
| $CO_2$ | — | 3.1% |
| $R_2O_3$ | — | 23.2% |

(wherein $R_2O_3$ is described in example 1), with a fly ash content of between 60–65% of dry sludge solids. A first such sludge slurry had a solids content of 50% by weight [sludge solids - 50%], and a second sludge slurry having the same analysis had a solids content of 38.9% by weight [Sludge Solids - 38.9%]. To each of the two sludges there was added 5% by weight based on sludge solids of a ground, granulated blast furnace slag (3100 sq. cm/gr.) as described in example 1. Stabilization tests were run, as described in example 1, and penetrometer readings taken at predetermined time intervals. The readings were as follows:

| Elapsed time After Slag Addition (days) | Penetrometer Reading (Tons/ft.²) | |
|---|---|---|
| | [Sludge Solids—50%] | [Sludge Solids—38.9%] |
| 5 | 1.3 | 0.10 |
| 10 | 4.5 | 1.50 |
| 28 | 4.5+ | 3.5 |
| 39 | 4.5+ | 3.75 |
| 46 | 4.5+ | 4.25 |
| 54 | 4.5+ | 4.5+ |

As illustrated, in sludges of the same analysis, the rate of stabilization increases with an increase in solids content of the sludge slurry.

EXAMPLE 3

Experiments were run to determine the effect of an increased amount of granulated blast furnace slag at a constant solids content of sludge slurry. The sludge used was that defined in example 2 at 38.9% solids [sludge solids 38.9%]. To a portion of sludge slurry, 5% granulated blast furnace slag, based on dry sludge solids, was added [5% B/F/S], while to another portion of the sludge slurry 10% was added [10% B/F/S]. The slag had been ground to a Blaine value of 3100 sq. cm/gr. Penetrometer readings, as in example 1, taken at predetermined intervals showed:

| Elapsed Time After Slag Addition (days) | Penetrometer Reading (Tons/ft.²) | |
|---|---|---|
| | [5% B/F/S] | [10% B/F/S] |
| 5 | 0.10 | 0.90 |
| 10 | 1.50 | 3.75 |
| 28 | 3.50 | 4.5+ |
| 39 | 3.75 | 4.5+ |
| 46 | 4.25 | 4.5+ |
| 48 | 4.25 | 4.5+ |
| 54 | 4.5+ | 4.5+ |

As is seen, the rate of stabilization is increased as the amount of granulated blast furnace slag is increased at constant solids content sludge slurries.

EXAMPLE 4

Experiments were made to determine the effect of the particle size of the ground blast furnace slag on the rate of stabilization of sludges with the same chemical composition and solids content. Three aliquots of the sludge slurry analyzed in example 2, each having a solids content of 38.2% by weight and a fly ash content between 60–65% of dry solids were taken. To Aliquot A, there was added 5% by weight of the dry sludge solids, of granulated blast furnace slag as received from a producer; to Aliquot B, there was added 5 % by weight of the dry sludge solids, of the same granulated blast furnace slag, ground to a particle size of a Blaine value of 1750 sq. cm/gr. and; to Aliquot C, there was added 5% by weight, based on dry sludge solids of the same granulated blast furnace slag, ground to a particle size of Blaine value of 3100 sq. cm/gr. The results of penetrometer tests carried out as described in example 2 were:

| Elapsed Time Following Slag Addition (days) | Penetrometer Reading (Tons/ft.$^2$) | | |
|---|---|---|---|
| | Aliquot A | Aliquot B | Aliquot C |
| 3 | Soft | Soft | 0.25 |
| 6 | Soft | Firm | 1.0 |
| 21 | 0.20 | 2.00 | 3.15 |
| 32 | 0.25 | 2.25 | 3.75 |
| 39 | 0.50 | 3.00 | 3.75 |
| 45 | 0.50 | 3.10 | 4.5+ |

The particle size of the granulated blast furnace slag thus has an effect upon the rate of stabilization of the sludge, with finer particle sizes such as in the range of 1800–4000 sq. cm/gr. resulting in increased rate of stabilization.

EXAMPLE 5

In order to show the surprising stabilization ability of granulated blast furnace slag as compared to cementitious material, experiments were run to compare the additive of this invention with Portland cement. The sludge used was analyzed anad contained:

| | | |
|---|---|---|
| $SiO_2$ | — | 28.3% |
| CaO | — | 21.0% |
| MgO | — | 0.5% |
| $So_2$ | — | 16.0% |
| $SO_3$ | — | 3.5% |
| $CO_2$ | — | 3.0% |
| $R_2O_3$ | — | 20.5% (as defined in Example 1) |
| $Fe_2O_3$ | — | 3.6% | and had a solids content of 40.5% by weight, with a fly ash content of about 55% of the dry sludge solids.

To a portion of the sludge slurry there was added 5%, based on dry sludge solids of Type I Portland Cement of a particle size of 3000 sq. cm/gr. Blaine [Cement]; while to a second portion of sludge slurry there was added 5%, based on dry sludge solids of ground, granulated blast furnace slag of a particle size of 3000 sq. cm/gr. Blaine [Blast Furnace Slag]. The portions were checked with penetrometer readings as described in example 1 and the results were:

| Elapsed Time Following Additive Addition (days) | Penetrometer Reading (Tons/ft.$^2$) | |
|---|---|---|
| | [Cement] | [Blast Furnace Slag] |
| 9 | 1.00 | 2.15 |
| 18 | 1.25 | 2.75 |
| 22 | 1.60 | 3.00 |
| 42 | 1.65 | 3.75 |
| 76 | 1.50 | 4.5 |
| 90 | 2.0 | 4.5+ |

The surprisingly rapid stabilization of sludge with granulated blast furnace slag is thus evidenced when compared with the rate of stabilization when using a cementitious material such as Portland cement.

EXAMPLE 6

The surprising rate of stabilization of sludge solids was granulated blast furnace slag was also evident when compared with second cementitious material, hydrated lime [Ca(OH)$_2$]. The sludge used analyzed:

| | | |
|---|---|---|
| $SiO_2$ | — | 33.6% |
| CaO | — | 24.2% |
| MgO | — | 0.4% |
| $SO_2$ | — | 12.2% |
| $SO_3$ | — | 4.2% |
| $CO_2$ | — | 3.0% |
| $R_2O_3$ | — | 24.4% (as defined in Example 1) | and had a solids content of 36.0% with the fly ash content being approximately 65% of the dry solids. To one portion of sludge slurry there was added 10%, based on sludge solids, of pulverized slaked lime [Ca(OH)$_2$] while to a second portion was added 10%, based on sludge solids, of ground granulated blast furnace slag, 3300 Blaine (Blast Furnace Slag). Penetrometer readings were taken on both portions at intervals and the results were as follows:

| Elapsed Time after Addition of Additive (days) | Penetrometer Reading (Tons/ft.$^2$) | |
|---|---|---|
| | [Ca(OH)$_2$] | [Blast Furnace Slag] |
| 10 | 0 | 1.85 |
| 12 | 0 | 2.40 |
| 19 | 0.50 | 3.25 |
| 26 | 1.25 | 4.25 |
| 33 | 1.75 | 4.25 |

As is seen, the granulated blast furnace slag effected a much more rapid stabilization of the sludge than did the hydrated lime.

EXAMPLE 7

The addition of a cementitious material such as lime (CaO) to the ground, granulated blast furnace slag showed no appreciable increase in the rate of stabilization of sludges. As an experiment, a sludge slurry, having the chemical composition of the sludge slurry used in example 2, with a solids content of 38.9%, was apportioned with four aliquots made. Aliquot A had added thereto 5% of ground granulated blast furnace slag (3100 Blaine); Aliquot B has 5½% of the ground granulated blast furnace slag (3100 Blaine) and 2% burnt lime of a small particle size (41% + 100 mesh; 72% + 200 mesh; 93% + 325 mesh; 7% − 325 mesh) added thereto. Aliquot C had added thereto 7½% ground, granulated blast furnace slag as added to Aliquot A; while Aliquot D had 8% of said ground, granulated blast furnace slag and 2% of the above-described burnt lime added thereto. The aliquots were subjected to penetrometer tests and gave the following values:

| Time After Addition of Additives (days) | Penetrometer Reading (Tons/ft.²) | | | |
|---|---|---|---|---|
| | Aliquot A | Aliquot B | Aliquot C | Aliquot D |
| 5 | 0.10 | 0 | 0.50 | 0.30 |
| 10 | 1.50 | 1.40 | 2.40 | 2.30 |
| 19 | 4.10 | 3.60 | 4.50 | 4.5+ |
| 28 | 3.50 | 4.25 | 4.5+ | 4.5+ |
| 39 | 3.75 | 4.5+ | 4.5+ | 4.5+ |
| 46 | 4.25 | 4.5+ | 4.5+ | 4.5+ |
| 48 | 4.25 | 4.5+ | 4.5+ | 4.5+ |
| 54 | 4.50 | 4.5+ | 4.5+ | 4.5+ |

As is seen, the addition of a cementitious material such as lime to the ground, granulated blast furnace slag had no appreciable affect on the rate of stabilization of a sludge.

EXAMPLE 8

In order to demonstrate the surprising action of granulated blast furnace slag on sludge stabilization, experiments were made to show that the slag is effective on sludges containing varying degrees of fly ash, since fly ash is itself a pozzolanic material. Two sludges were used; Sludge I containing about 20% fly ash based on sludge solids and Sludge II containing about 65% fly ash based on sludge solids. The analyses of the sludges were as follows:

| Components | Sludge I | Sludge II |
|---|---|---|
| $SiO_2$ | 10.3% | 33.6% |
| CaO | 47.0% | 24.2% |
| MgO | 0.5% | 0.4% |
| $SO_2$ | 25.6% | 12.2% |
| $SO_3$ | 6.6% | 4.2% |
| $CO_2$ | 4.2% | 3.0% |
| $R_2O_3$ (as defined in Example 1) | 8.9% | 24.4% |

The solids content of Sludge I was 35% and that of Sludge II, 36%. To each of the two sludges there was added 10% of the dry sludge solids weight of ground, granulated blast furnace slag (3300 Blaine). The sludges were subjected to penetrometer tests, as aforedescribed, and the results were:

| Elapsed Time After Addition of Slag | Penetrometer Reading (Tons/ft.²) | |
|---|---|---|
| | Sludge I | Sludge II |
| 7 | — | 1.50 |
| 8 | 0.75 | — |
| 10 | — | 1.85 |
| 11 | 2.25 | — |
| 12 | — | 2.40 |
| 19 | — | 3.25 |
| 20 | 3.75 | — |
| 26 | — | 4.25 |
| 28 | 4.25 | — |
| 33 | — | 4.25 |
| 34 | 4.25 | — |

Both Sludge I and Sludge II reached a penetrometer reading of 4.25 Tons/ft.² after about 26–28 days, illustrating that the amount of fly ash in a sludge does not affect significantly the rate of stabilization of sludges where ground, granulated blast furnace slag is added thereto.

EXAMPLE 9

In order to illustrate that a sludge containing no fly ash can be stabilized by the process of the present invention, the following sludge obtained from smelter gas scrubber was treated:

| | | |
|---|---|---|
| $SiO_2$ | — | 0.18% |
| CaO | — | 43.8% |
| $SO_2$ | — | 45.74% |
| $CO_2$ | — | 1.0% |
| $Al_2O_3$ | — | 0.4% |
| $Fe_2O_3$ | — | 0.3% |
| $Na_2O$ | — | 0.1% |
| $K_2O$ | — | 0.01 |
| Moisture | — | 6.23 |

The solids content of the sludge was 42% and no fly ash was present. To the sludge there was added 10% based on sludge solids of ground, granulated blast furnace slag (3300 Blaine). Penetrometer readings taken at intervals, as previously described, gave the following results:

| Elapsed Time After Slag Addition (days) | Penetrometer Reading (Tons/ft.²) |
|---|---|
| 1 | 0 |
| 3 | 0.2 |
| 4 | 0.75 |
| 7 | 2.75 |
| 8 | 4.25 |
| 16 | 4.5+ |

We claim:

1. The method of stabilizing the solids content of an aqueous sludge slurry of predominantly inorganic solids consisting essentially of calcium sulfates and calcium sulfites, wherein the aqueous sludge slurry comprises 25–60% solids and correspondingly 75–40% aqueous liquor, comprising; adding to said aqueous sludge slurry an amount of between 1–20 percent, based upon the solids content of the slurry, of a granulated blast furnace slag, whereby a stabilized mass of said solids is formed upon setting of said solids.

2. The method as defined in claim 1 wherein said setting of said solids and formation of said stabilized mass is carried out while said solids are covered with supernatant aqueous liquor of the slurry.

3. The method as defined in claim 1 wherein said aqueous sludge slurry is the product of a wet scrubber system for the removal of sulfur dioxide from combustion gases and wherein said sludge solids contain calcium sulfite and calcium sulfate.

4. The method as defined in claim 3 wherein said sludge solids also contain fly ash.

5. The method as defined in claim 1 wherein said granulated blast furnace slag, prior to addition to said sludge slurry, is ground to a particle size of between 1800 to 4000 sq. cm per gram.

6. The method as defined in claim 1 wherein said sludge slurry solids are devoid of fly ash.

7. The product produced by the method of claim 1.

8. The product produced by the method of claim 4.

9. The product produced by the method of claim 6.

10. The method of stabilizing the solids content of an aqueous sludge slurry of predominantly inorganic solids and consisting essentially of calcium sulfite, calcium sulfate and fly ash, wherein the aqueous sludge slurry comprises 25–60% solids and correspondingly 75–40% aqueous liquor, comprising:

grinding a granulated blast furnace slag to a particle size in the range of 1800–4000 sq. cm. per gram and adding said ground granulated blast furnace slag to said aqueous slurry in an amount of 1–20%, based on the solids content of the slurry, whereby a stabilized mass of said solids is formed upon setting of said solids.

11. The method defined in claim 10 wherein said ground granulated blast furnace slag is intimately mixed with said sludge slurry solids.

* * * * *